(12) United States Patent  
Rudolph

(10) Patent No.: US 8,235,007 B1  
(45) Date of Patent: Aug. 7, 2012

(54) CABLE RELEASE FOR DROP CURTAINS IN LIVESTOCK CONFINEMENT BUILDINGS

(76) Inventor: Andrew E. Rudolph, Bluford, MO (US)

(*) Notice: Subject to any disclaimer, the term of this patent is extended or adjusted under 35 U.S.C. 154(b) by 191 days.

(21) Appl. No.: 12/850,287

(22) Filed: Aug. 4, 2010

(51) Int. Cl.
 *A01K 1/00* (2006.01)
(52) U.S. Cl. .......................................... 119/436; 119/448
(58) Field of Classification Search .................. 119/436, 119/448, 161, 493
 See application file for complete search history.

(56) References Cited

U.S. PATENT DOCUMENTS

| | | | | |
|---|---|---|---|---|
| 3,429,298 | A | * | 2/1969 | Thomason ..................... 119/448 |
| 3,474,761 | A | * | 10/1969 | Thomason ..................... 119/448 |
| 3,973,173 | A | | 8/1976 | Smith |
| 4,428,278 | A | * | 1/1984 | Sutton, Jr. ..................... 454/229 |
| 4,605,162 | A | | 8/1986 | Crider |
| 5,031,574 | A | * | 7/1991 | McDowell ..................... 119/448 |
| 5,085,368 | A | * | 2/1992 | Beckman et al. ............. 236/49.3 |
| 5,119,762 | A | * | 6/1992 | Yockey et al. ................. 119/448 |
| 5,136,980 | A | * | 8/1992 | Schoeber et al. ............. 119/448 |
| 5,325,813 | A | | 7/1994 | Sutton, Jr. |
| 5,458,537 | A | * | 10/1995 | Crider et al. .................. 454/256 |
| 5,924,924 | A | | 7/1999 | Richardson |
| 6,722,972 | B1 | | 4/2004 | Holtkamp |
| 6,871,842 | B2 | * | 3/2005 | Sutton ........................... 254/342 |

* cited by examiner

*Primary Examiner* — Yvonne Abbott
(74) *Attorney, Agent, or Firm* — Grace J. Fishel

(57) ABSTRACT

A cable release for use in a curtain control system for controlling drop curtains in a livestock confinement building. The cable release operates with cable drop devices having a cord release. A U-shaped segment of a main cable attached to the drop curtains is held in tension by an anchor with a latch operated by a lock handle attached to the cord of the cable drop device. The curtains are dropped when the cord is released by the cable drop device and U-shaped segment is released from anchor.

10 Claims, 12 Drawing Sheets

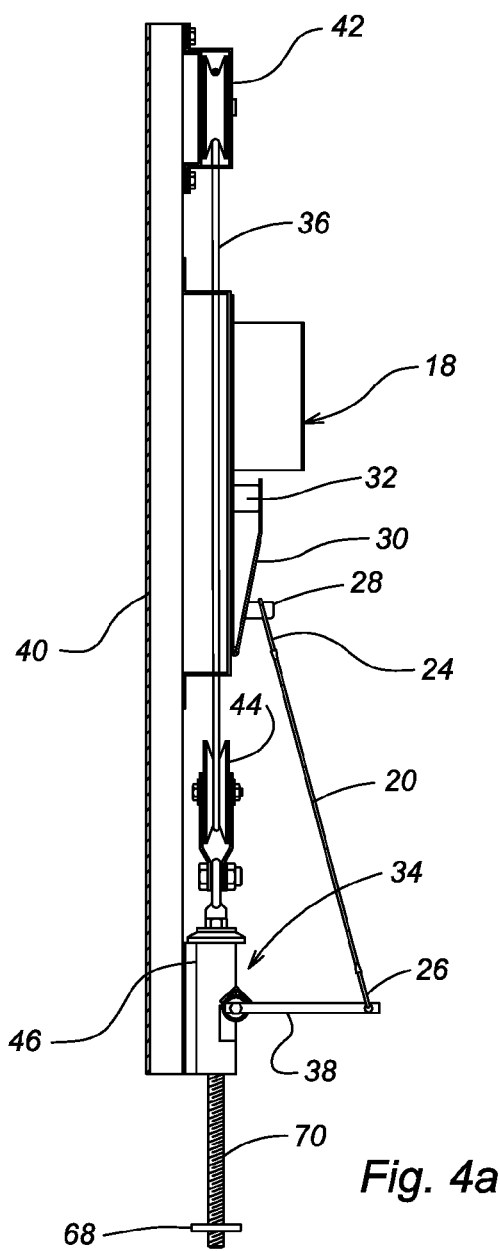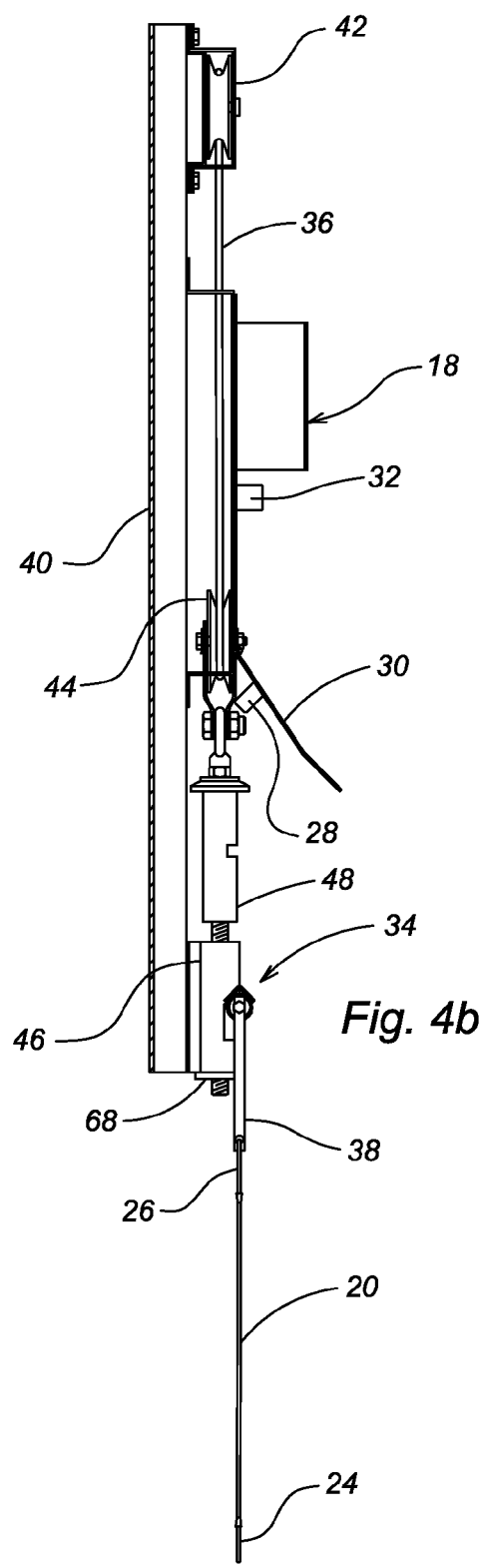

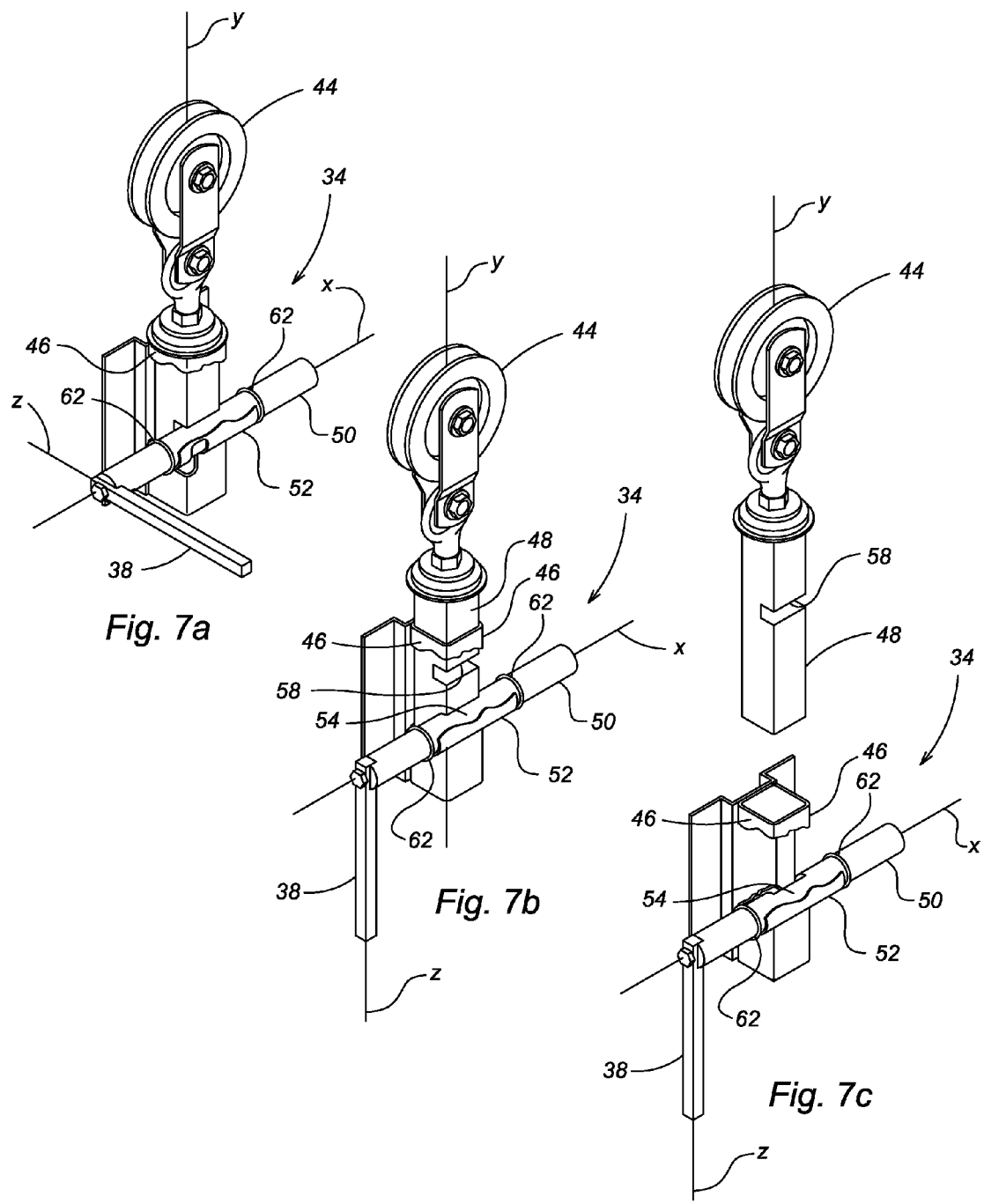

CABLE RELEASE FOR DROP CURTAINS IN LIVESTOCK CONFINEMENT BUILDINGS

BACKGROUND OF THE INVENTION

1. Field of the Invention

The present invention relates to a cable release for winch operated drop curtains which allows the curtains to drop without unwinding cable from the winch as is needed in all other curtain control systems.

2. Brief Description of the Prior Art

Commercial livestock confinement buildings for poultry or hogs are artificially ventilated and include openings in the sidewalls which are closed with drop curtains. Forced ventilation allows for growing more animals at less expense in less space. During normal operations, the electric ventilating fans constantly remove carbon dioxide and heat generated by the animals and continuously provide fresh air. The curtains may be partially opened and closed as necessary to maintain the proper temperature for the animals.

In the event of a power failure in the electric ventilation fans or an unusual increase in the inside temperature, it is necessary to take immediate action as overheated, densely packed animals can suffocate and die. Such action usually consists of opening all of the curtains allowing cross ventilation for the animals through the sidewall openings.

Typically in such confinement buildings, the curtains are raised and lowered with a cable which is operated by a winch. A curtain drop device responsive to power failure or increase in temperature is attached to the winch handle, which when freed allows the cable to unwind from the winch and the curtains to drop. There are a number of different curtain drop devices as discussed below which rely on the winch as the safety device. There are problems, however, with these systems. For example, if the winch mechanism is rusty, the release action may fail and the animals may die. Rusting is not an uncommon occurrence as the atmosphere in a livestock confinement building is very corrosive. Even if the cable, winch gears and winch bearings are not corroded, as the cable is wound on the winch under the weight of the curtains, wraps of the cable may lodge together such that the cable does not unwind properly when the handle is released. Other problems arise, for example, if an operator fails to release a locking dog on the winch after raising the curtains and attaching the curtain drop device. Further, when the curtain drop device includes a cord release, sometimes the cord entangles in the winch stopping the cable from properly unwinding and the curtains from dropping. In view of these problems, there is a need for a cable release which does not rely on the winch as the safety device.

BRIEF SUMMARY OF THE INVENTION

In view of the above, it is an object of the present invention to provide to provide a cable release for drop curtains that does not depend on the winch as the safety device. It is another object to provide a cable release which operates with any cable drop device with a cord release, including all of those currently on the market. Other objects and features of the invention will be in part apparent and in part pointed out hereinafter.

In accordance with the invention, a cable release is provided for use in a curtain control system for controlling curtains in a livestock confinement building having an electrically-operated forced air ventilation system and drop curtains, the drop curtains providing supplemental ventilation during power failure or excess temperatures. The curtain control system includes a main lifting cable attached to the drop curtains, a winch for lifting the drop curtains into closed position and a curtain drop device with a cord release.

The cable release makes use of a U-shaped segment of the main lifting cable between a top of the drop curtains and the winch with the segment being longer than the linear distance between the top of the drop curtains and the winch. An anchor is attached to the U-shaped segment of cable with a latch for holding the U-shaped segment of cable in tension in a hold position. The latch is held in a hold position by the curtain drop device during application of electric current to the curtain drop device and a release position upon interruption of electric current to the curtain drop device. The latch in release position releases the anchor with the U-shaped segment of cable which allows the curtains to drop by a preselected amount.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 4a is a sectional view in power-on position taken along the plane of 4-4 in FIG. 2;

FIG. 4b is a sectional view after power failure taken along the plane of 4-4 in FIG. 3;

FIG. 7a is a perspective view on an enlarged scale of the first anchor in hold position;

FIG. 7b is a perspective view on an enlarged scale of the first anchor at the instant of power failure;

FIG. 7c is a perspective view on an enlarged scale of the first anchor in release position;

FIG. 11 a is perspective view on an enlarged scale of the second anchor in hold position with the drop curtains closed;

FIG. 11b is a perspective view on an enlarged scale of the second anchor in release position with the drop curtains open;

FIG. 12a is a sectional view in power-on position taken along the plane of 12a-12a in FIG. 11a;

FIG. 12b is a sectional view after power failure taken along the plane of 12b-12b in FIG. 11b;

DETAILED DESCRIPTION OF THE INVENTION

Figure 1:
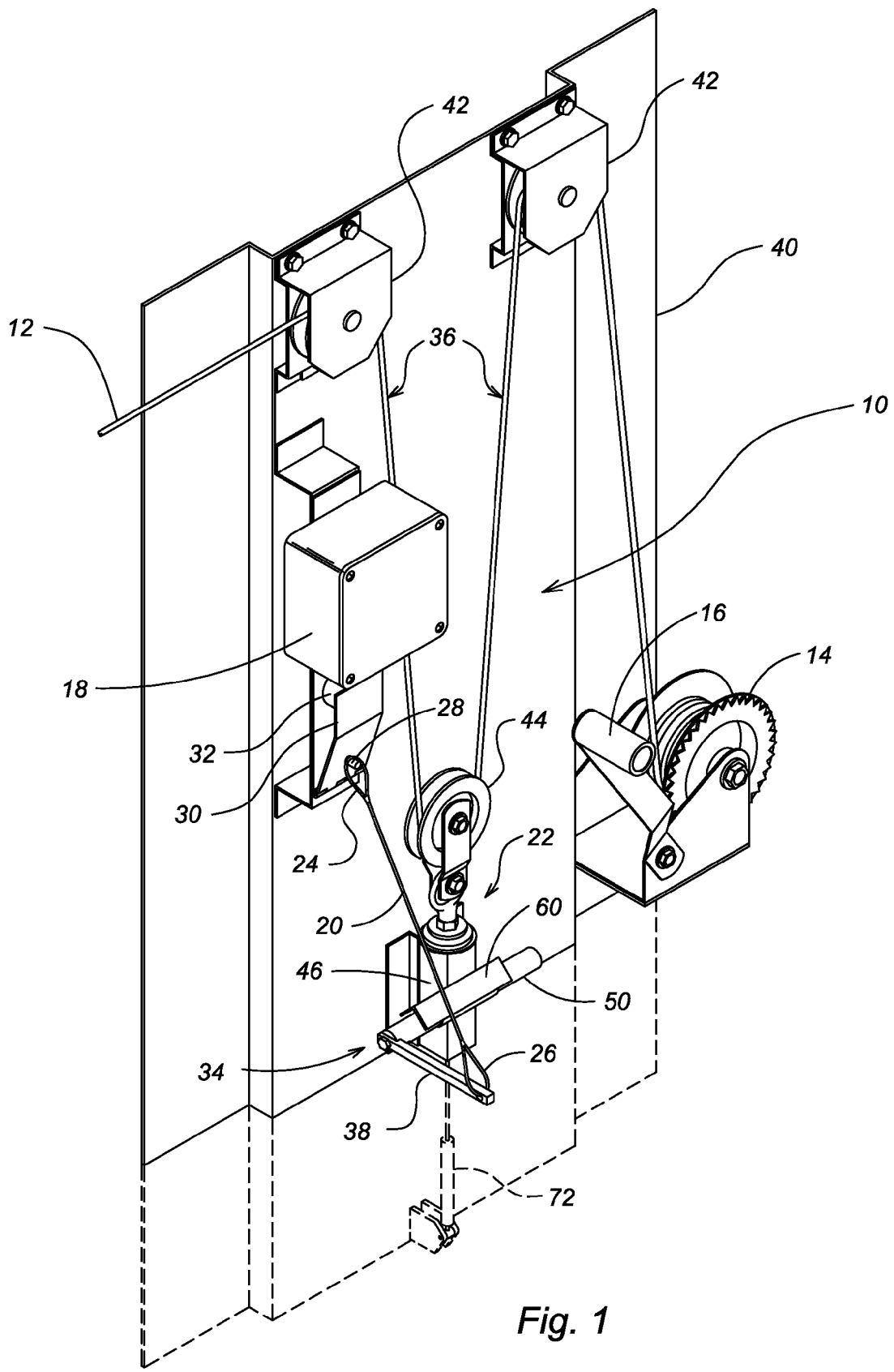
FIG. 1 is a perspective view of a panel mounted cable release unit in accordance with the present invention.
Figure 2:
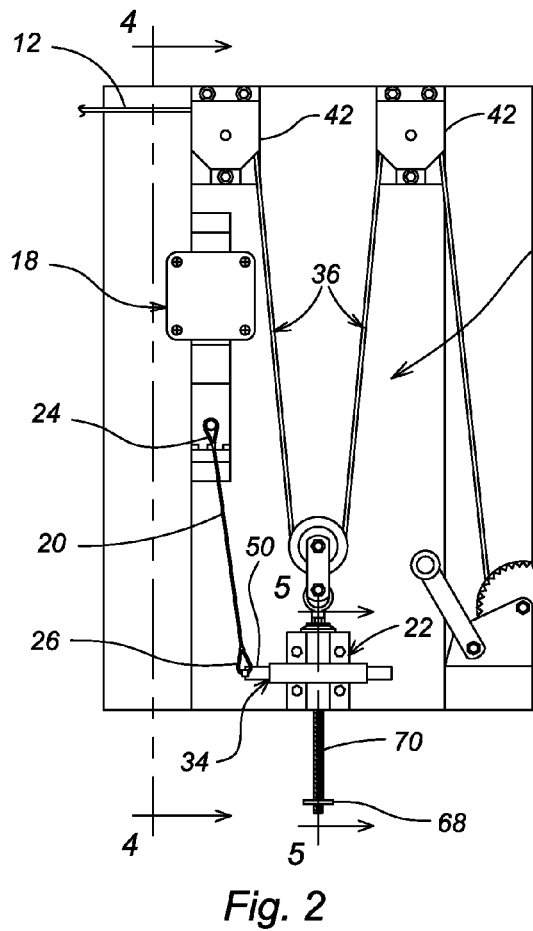
FIG. 2 is a front view of the panel mounted unit in power-on position with the drop curtains closed.

Referring to the drawings more particularly by reference character, reference number 10 refers to a cable release for drop curtains in accordance with the present invention. Cable release 10 is adapted for use in a curtain control system for controlling curtains in a livestock confinement building for poultry, hogs or the like having an electrically-operated forced air ventilation system. As used herein, the term "drop curtains" includes safety curtains, safety doors and actuated curtains. In such buildings, curtains are raised and lowered with a main cable 12 operated by a winch 14. The winch includes a handle 16 for winding cable on the drum of the winch. Various curtain drop devices 18 have been provided for holding winch handle 16 stationary with a release cord 20 to prevent unwinding of the cable on the winch and a release position allowing the cable to unwind and the curtains to drop in response to a power failure in the ventilation system or an overheating thermostat which cuts power to the curtain drop device. As used herein the term "cord" as it applies to the connector between curtain drop device 18 and handle 16 of winch 14 embraces connectors generally including strings, wires, cables, chains and so forth.

A representative but non-limiting number of curtain drop devices 18 with a cord release 20 useful in the present invention are discussed below. For example, U.S. Pat. No. 5,325,813 describes a device including a hook attached to the end of a cord for cradling the handle. The hook is held in the hold position by an electromagnet. When power is interrupted to the electromagnet by a power failure or by a thermostat in response to excess temperatures, the hook is released which releases the handle and permits the curtains to drop. In the present invention, cord 20 is attached to an anchor 22 as described below.

The curtain drop device 18 shown in the drawings is similar to that described in U.S. Pat. No. 6,722,972 wherein a tension device such as cord 20 having a first loop 24 at one end and a second loop 26 at the other end connects curtain drop device 18 with handle 16 of winch 14. First loop 24 is attached to a pin 28 on a hinged plate 38 which is held in closed position by an electromagnet 32. When electric power is interrupted, hinged plate 38 pivots open and first loop 24 slips off pin 28 thus releasing the force holding handle 16. For use in the present invention, cord 20 is attached to a latch 34 of anchor 22.

Other curtain drop devices 18 may also be used to release latch 34 of anchor 22. Included, for example, is the curtain drop device disclosed in U.S. Pat. No. 4,605,162 wherein an "expansion finger" is inserted in a sleeve. Expansion finger is mounted on a trip arm. As long as electric current is flowing through the curtain drop device, the expansion finger is held in the sleeve but when electric current is interrupted, the expansion finger is released from the sleeve. As the trip arm pivots, tension on cord 20 is released.

One commercially available curtain drop device 18 activates a separate circuit on power failure. The separate circuit contains a dry cell battery which heats a nichrome heater wire. The cord 20 is meltable, so that as the wire heats, the cord burns through and releases handle 16. This curtain drop device 18 may also be used with cable release 10 of the present invention as may other commercially available or patented curtain drop devices with a cord release.

With reference to the drawings and in major part, cable release 10 of the present invention includes a U-shaped segment of cable 36, anchor 22 with latch 34 for holding the segment in tension in closed position and curtain drop device 18 with cord 20. Latch 34 is operated with a lock handle 38 which is moveable between a hold position for holding latch 34 closed and a release position in response to the cord 20 of curtain drop device 18 as more particularly described below. Cable release 10 may be used over and over again as nothing is destroyed.

As shown in FIG. 1, cable release 10 may be mounted on a panel 40 attached to the frame of a livestock confinement building. Panel 40 simplifies installation but cable release 10 may be directly attached to the frame of the building. With continuing reference to FIG. 1, a pair of fixed pulleys 42 are provided along a top edge of panel 40 in line with main curtain cable 12. Mounting holes on panel 40 are provided such that a standard winch 14 may be mounted along a bottom edge of panel 40 on the right or left side thereof such that winch 14 is position opposite main curtain cable 12 depending on the setup of the curtains in the curtain control system. A movable pulley 44 is secured to anchor 22 which is positioned between fixed pulleys 42. U-shaped segment 36 is formed in main cable 12 as it passes over fixed pulleys 42 and under moveable pulley 44. Moveable pulley 44 is positioned a distance below fixed pulleys 42 such that when U-shaped segment 36 is released from anchor 22 the curtains are dropped by a preselected amount. While fixed and moveable pulleys 42, 44 are preferred because of reduced friction, U-shaped segment 36 may be formed by threading main cable 12 through eyes, over posts or the like on panel 40. As shown, curtain drop device 18 with cord release 20 is attached to panel 40 above anchor 22.

First Anchor, Sidewall Attachment:

In the form illustrated in FIGS. 1 through 4b, first anchor 22 includes a sleeve 46 which is attached to panel 40. Movable pulley 44 is mounted on a bolt 48 which is slidable within sleeve 46 and is locked therein with latch 34 operated by lock handle 38. Lock handle 38 is moveable between a hold position for locking bolt 48 in sleeve 46 and a release position in response to cord 20 of curtain drop device 18.

As best seen in FIGS. 5a-5c and FIGS. 7a-7c, bolt 48 has a longitudinal center axis y and latch 34 is a lock rod 50 with a longitudinal center axis x. Lock handle 38 attached to lock rod 50 and lock rod 50 is journaled in a tube 52 attached on the outside of sleeve 46 such that the longitudinal center axis y of bolt 48 is normal to the longitudinal center axis x of lock rod 50. Lock rod 50 has a slot 54 with a bottom 56 formed along a plane parallel to the longitudinal axis x of lock rod 50 and a width and depth such that bolt 48 may slide through slot 54 when bottom 56 of slot 54 is parallel to the longitudinal center axis of bolt 48 but which otherwise partially blocks the passageway through sleeve 46. Lock handle 38 is attached to lock rod 50 such that a longitudinal center axis z of lock handle 38 is parallel to bottom 56 of slot 54 in lock rod 50. As shown, lock rod 50 may be notched to receive lock handle 38. Bolt 48 has a slot 58 with a width and depth such that lock rod 50 may rotate in bolt 48 in a first direction but is stopped by a sidewall of slot 58 in bolt 48 when rotated in a second direction corresponding to the hold position of latch 34. With the tension on cord 20 released, a force effective to rotate lock handle 38 downward in a first direction corresponding to the release position of latch 34 is applied by the weight of the curtains when bolt 48 and lock rod 50 are spaced so that the slot 58 in bolt 48 contacts less than a radial amount of slot bottom 56 in lock rod 50 (see FIGS. 5a-5c). It will be recognized that bottom 56 of slot 54 in lock rod 50 and the sidewalls of slot 58 in bolt 48 may have other geometries other than illustrated, the important consideration being that slot 54 in lock rod 50 and slot 58 in bolt 48 contact and function under control of lock handle 38 and the weight of the curtain as described above. As seen in FIG. 1, a cover 60 may be provided over lock rod 50 and as seen in FIGS. 7a-7c, o-rings 62 may be provided for locking and sealing lock rod 50 in tube 52.

Figures 5A, 5B, 5C:
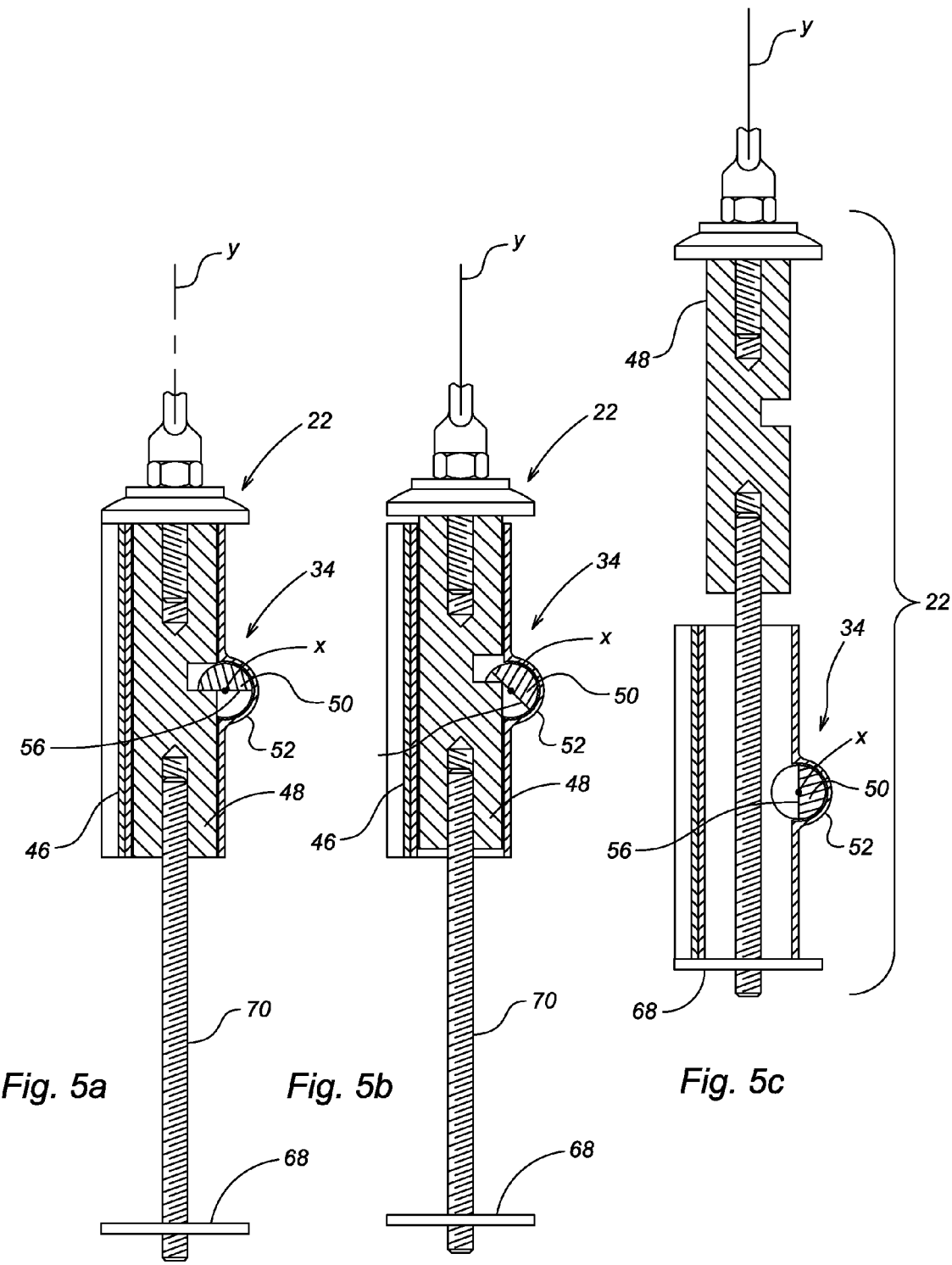
FIG. 5a is an enlarged sectional view taken along the plane of 5-5 in FIG. 2 showing first anchor in hold position.
FIG. 5b is an enlarged sectional view taken along the plane of 5-5 in FIG. 3 at the instant of power failure.
FIG. 5c is an enlarged section view taken along the plane of 5-5 in FIG. 3 showing first anchor in release position.
Figures 6A, 6B, 6C:
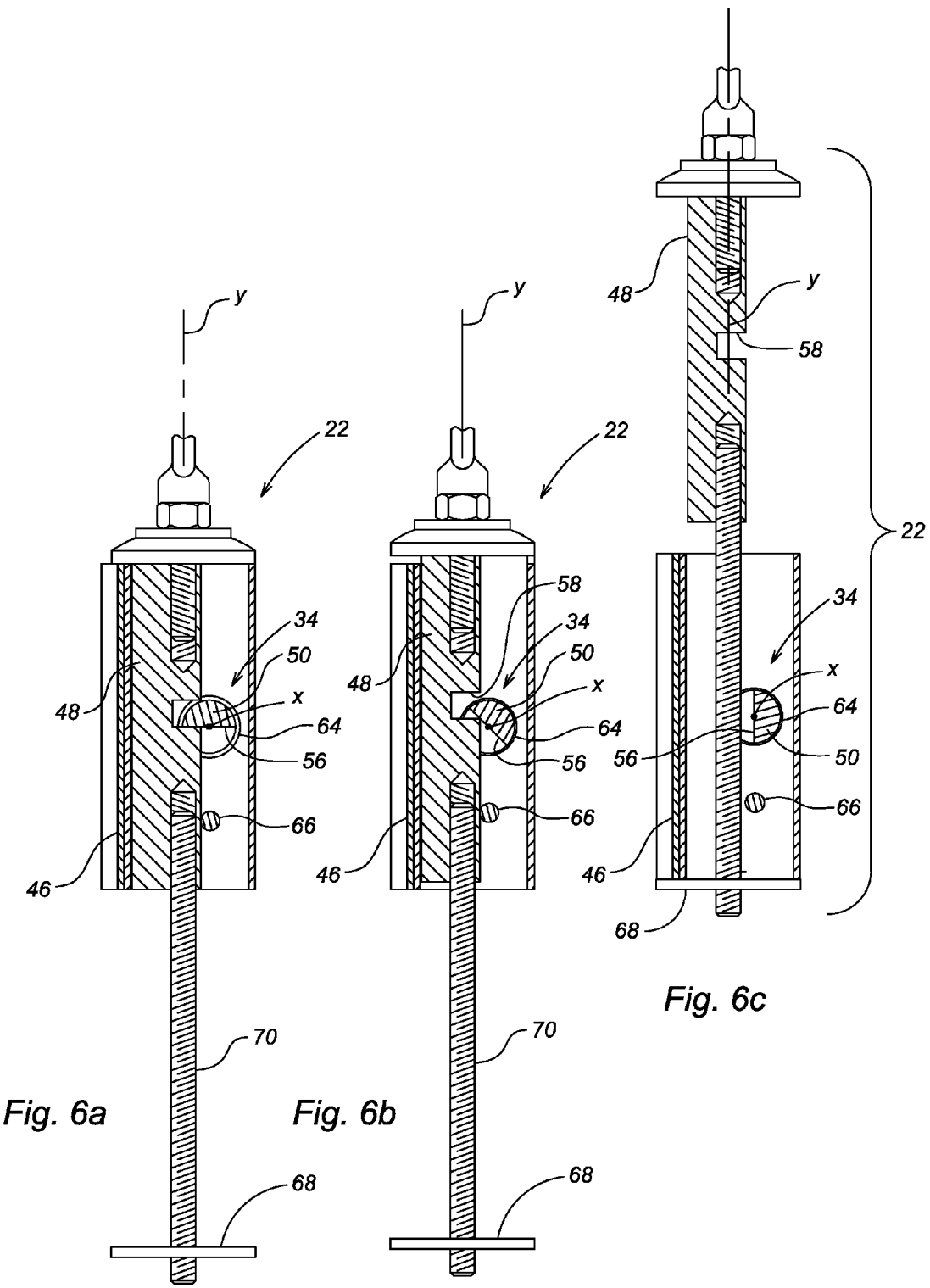
FIG. 6a is similar to FIG. 5a showing a variant of first anchor in hold position.
FIG. 6b is similar to FIG. 5b showing a variant of first anchor at the instant of power failure.
FIG. 6c is similar to FIG. 5c showing a variant of first anchor in release position.
Figure 8:
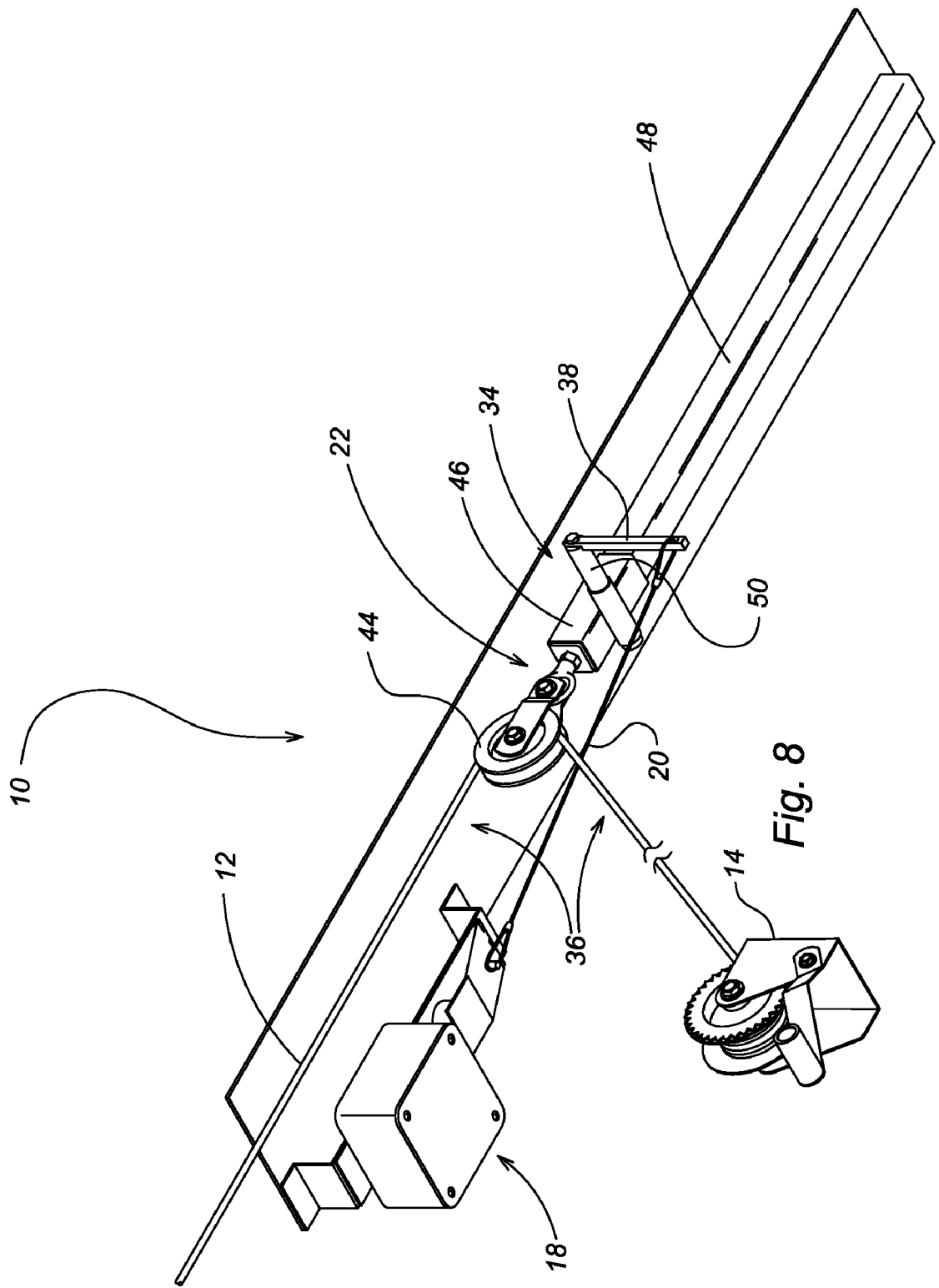
FIG. 8 is a perspective view of a ceiling mount of a cable release unit using first anchor.
Figure 9A:
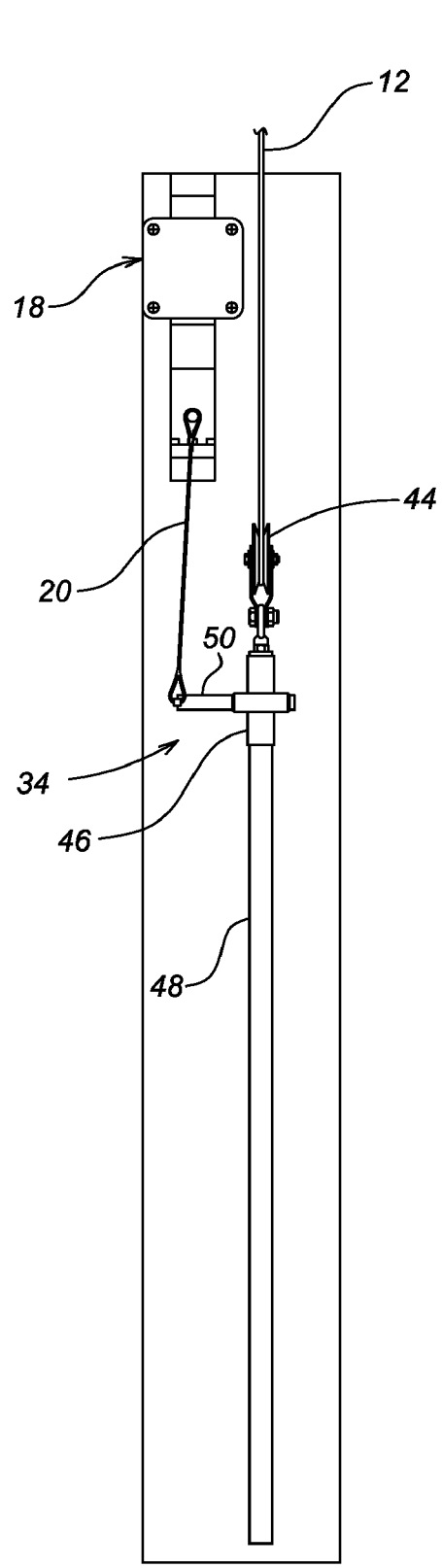
FIG. 9a is a plan view looking up of the ceiling mounted unit in power-on position.
Figure 9B:
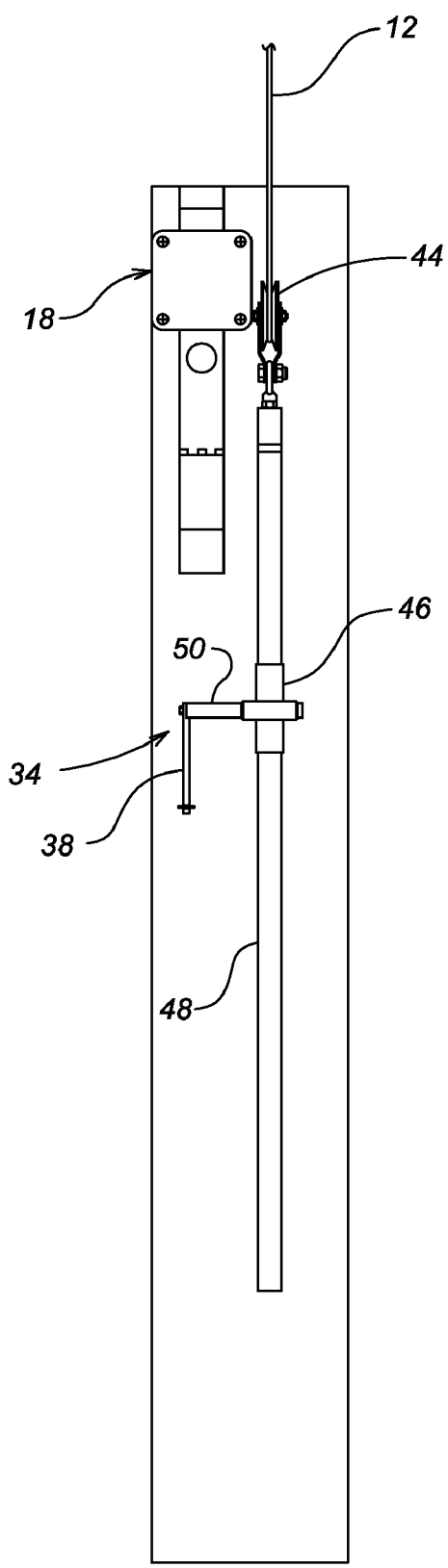
FIG. 9b is a plan view looking up of the ceiling mounted unit after power failure.
Figure 10:
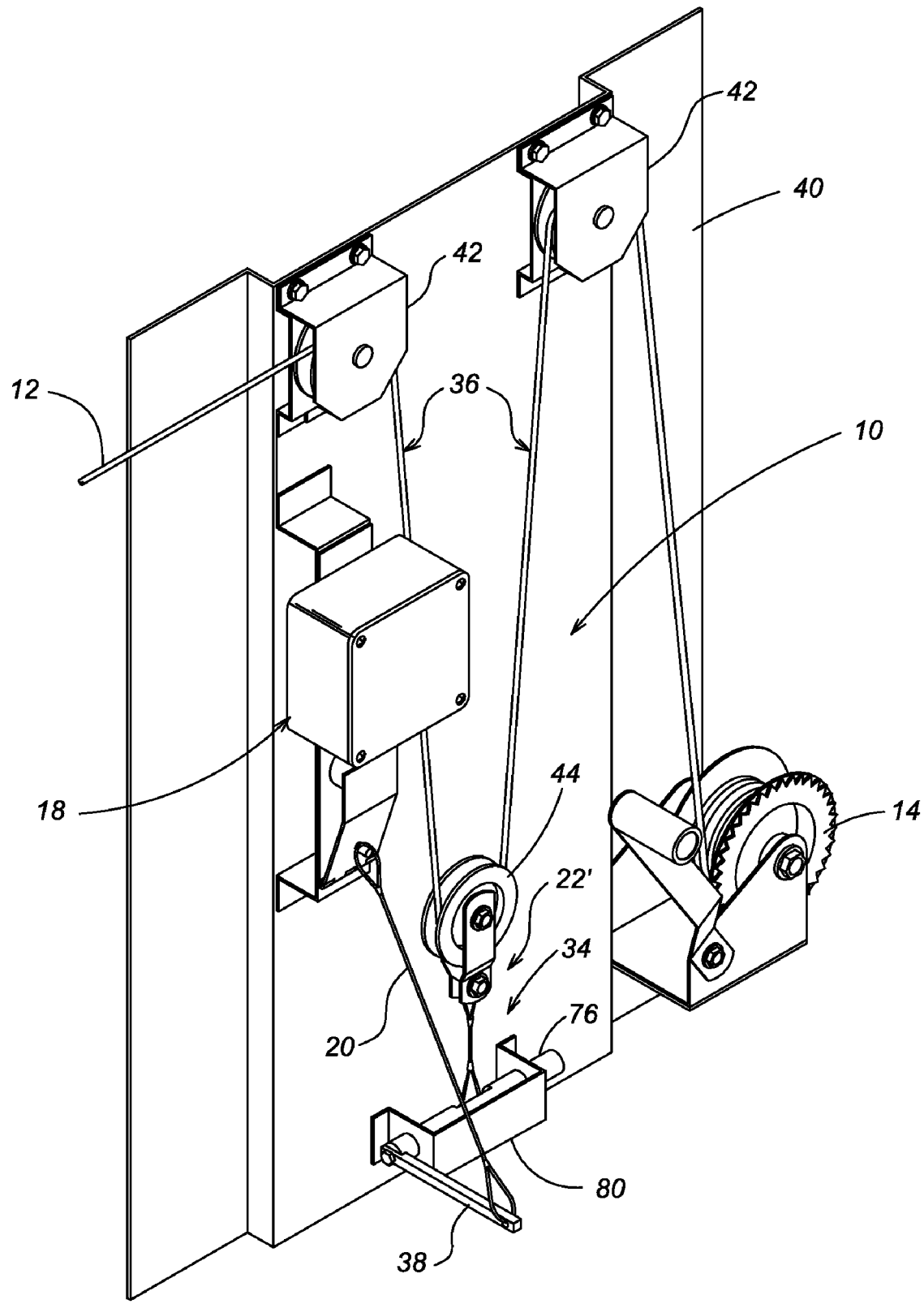
FIG. 10 is a perspective view of a panel mounted cable release unit showing a second anchor in accordance with the present invention.
Figures 11A, 11B, 12A, 12B:
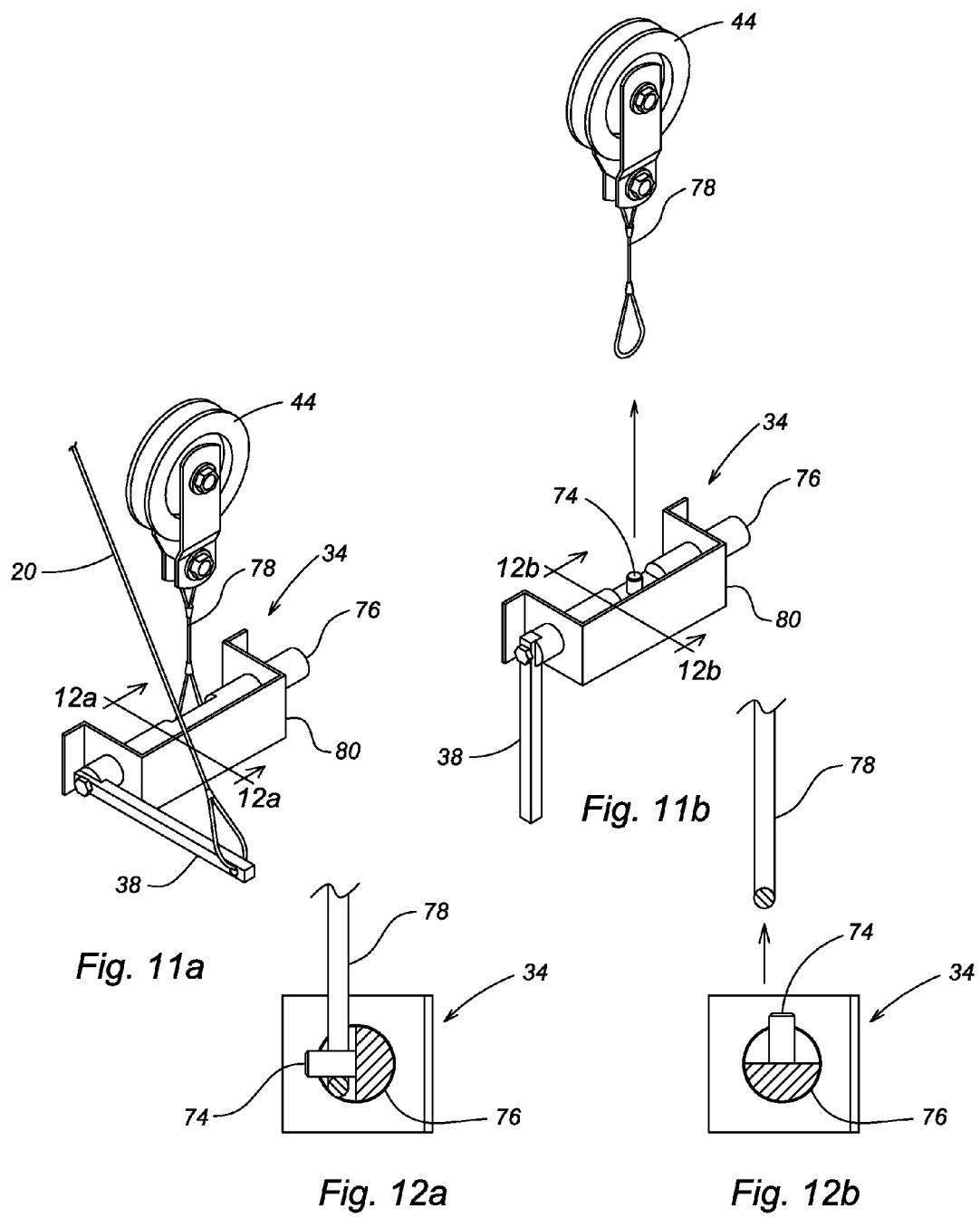

Turning back to FIGS. 6a-6c, a variant on anchor 22 shown in FIGS. 5a-5c is illustrated. In this instance lock rod 50 is journaled in apertures 64 provided in the sidewalls of sleeve 46, for which purpose the passageway through sleeve 46 is enlarged. One or more fences 66 parallel to lock rod 50 may be provided in sleeve 46 to stabilize bolt 48 for reciprocation therein. The spatial organization and requirements of slot 58 in bolt 48 and slot 54 in lock rod 50 remain the same.

Figure 3:
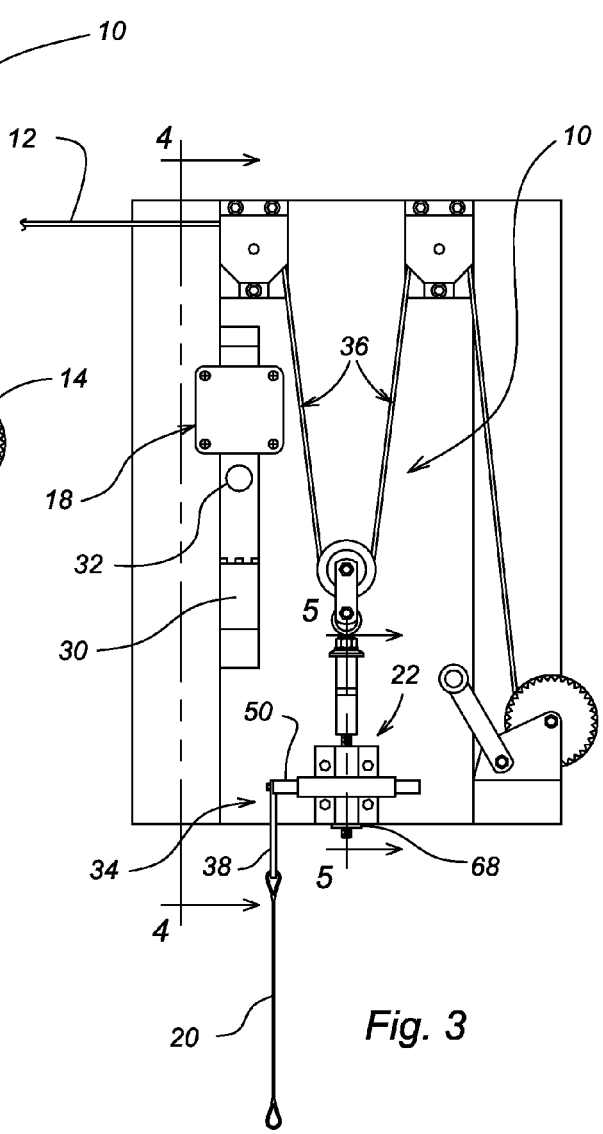
FIG. 3 a front view of the panel mounted unit after power failure with the drop curtains open.

In use as shown in FIGS. 2-3 and FIGS. 4a-4b, release cord 20 of curtain drop device 18 holds lock rod 50 in hold position by lock handle 38. For this purpose first loop 24 of cord 20 is attached to pin 28 on hinged plate 30 which is held in closed position by electromagnet 32 while second loop 26 applies an upward force on lock handle 38. When electric power is interrupted as shown in FIG. 3 and FIG. 4b, hinged plate 30 pivots open and first loop slips off pin 28. Tension on cord 20 is released thus allowing the weight of the curtains to rotate lock rod 50 as described above such that bolt 48 is released from sleeve 46. As bolt 48 moves upward carrying moveable pulley 44, the effective length of main cable 12 is extended thereby dropping the curtains by a preselected amount, that amount being the length of U-shaped segment 36. When a stop 68 is provided on a lower end of a threaded rod 70 attached to the bottom of bolt 48, the amount of curtain drop may be less than if bolt 48 were completely released from sleeve 46. As shown, stop 68 is threaded on rod 70 which is threaded into bolt 48. By controlling the throw of bolt 48 with stop 68, the amount of the curtain drop can be adjusted to weather conditions. In some instances, it may be desirable that curtains not drop suddenly for example turkeys tend to be frightened by sudden movements and pile up. In which case, a gas spring 72 as shown in FIG. 1 can be attached to bolt 48 to slow the drop of the curtains. From the above, it is seen that winch 14 is not involved in the safety release of the curtains. It will also be seen when cord 20 is attached to lock handle 38 as shown, cord is not thrown when anchor 22 is released and does not become entangled in the release mechanism as is the case when winch 14 is the safety release.

To return the curtains to closed position, curtain drop device 18 is reset and a stop on winch 14 is released such that enough main cable 12 is unwound that bolt 48 may be reset in sleeve 46 with lock rod 50 in a release position. Lock handle 38 is then lifted which causes lock rod 50 to rotate and reset anchor 22 to hold position whereupon second loop 26 of cord 20 is attached to lock handle 38. Excess cable 12 is taken up by winch 14 and the stop on the winch rest. Enough force is applied to lock handle 38 with second loop 26 of cord 26 to counter balance the force applied by the weight of the curtains to lock rod 50 to prevent rotation thereof.

First Anchor, Overhead Attachment

As illustrated in FIGS. 8 and 9a-19b, first anchor 22 may be attached to the overhead frame of a livestock confinement building. In this instance, winch 14 is spaced below moveable pulley 44 in a direction opposite to the direction of main cable 12 such that U-shaped segment 36 is formed by main cable 12 as it is threaded around moveable pulley 44.

Second Anchor

A second anchor 22' is shown in FIGS. 10, 11a-11b and 12a-12b. In this instance moveable pulley 44 is attached to a pin 74 on a shaft 76 by a cable 78. Shaft 76 is journaled in a bracket 80. Second loop 26 of cord 20 of curtain drop device 18 is attached to a lock handle 38 as before. When tension is released on cord 20 by curtain drop device 18, shaft 76 rotates under weight of the curtains and cable 78 with moveable pulley 44 is released.

Third Anchor

Figure 13:
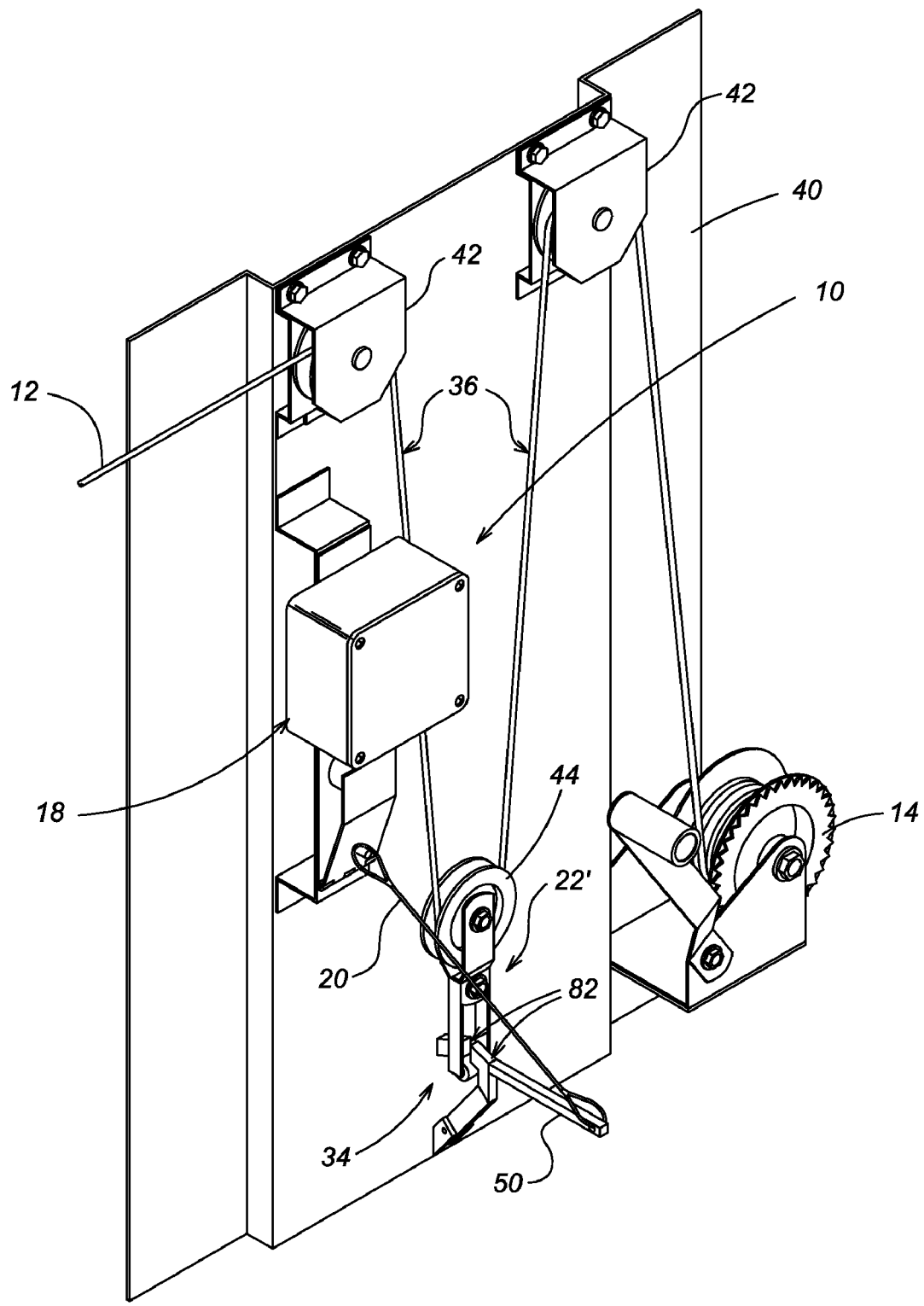
FIG. 13 is a perspective view of a panel mounted cable release unit showing a third anchor in accordance with the present invention.
Figures 14A, 14B:
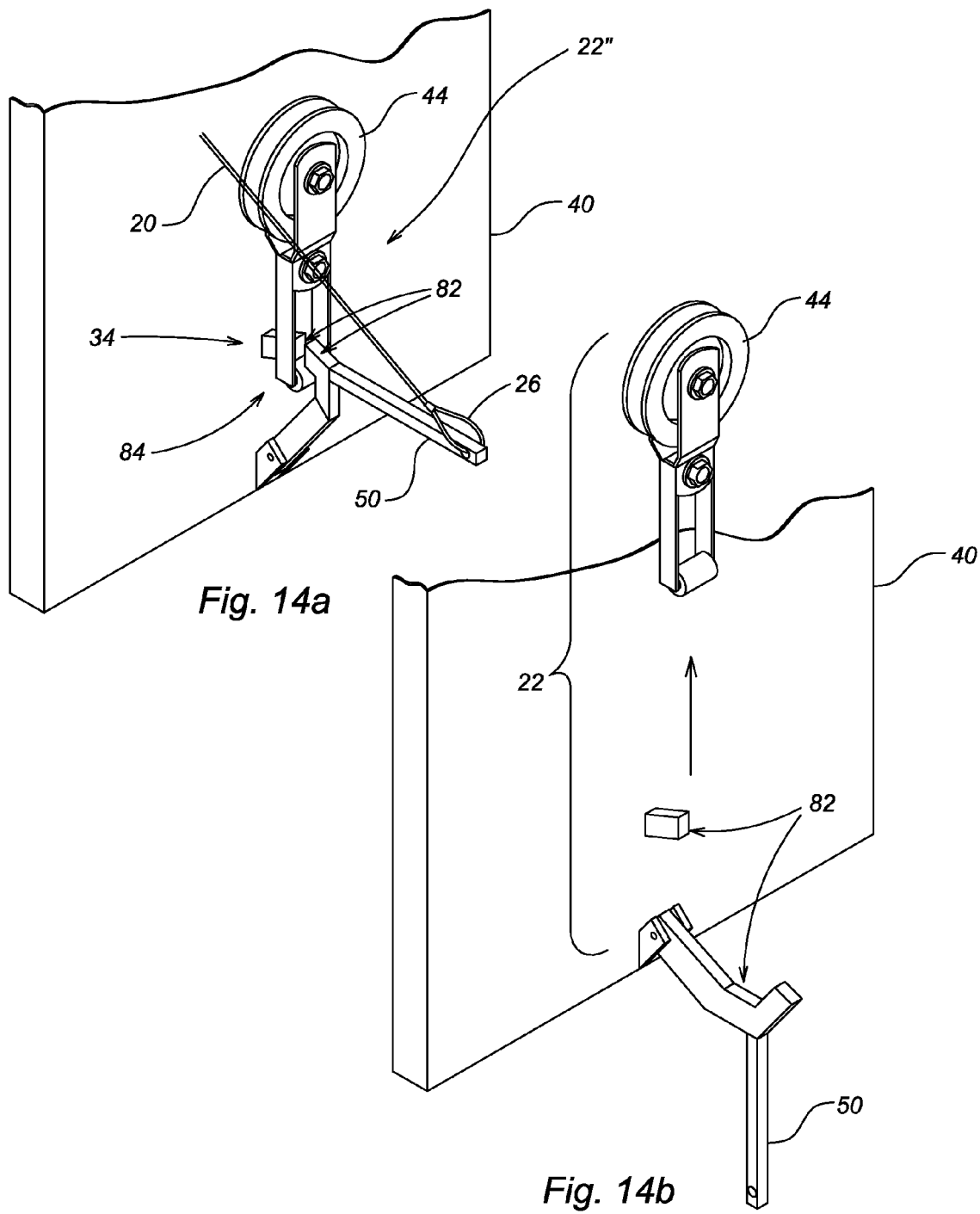
FIG. 14a is a perspective view on an enlarged scale showing the third anchor in hold position with power on; and, FIG. 14b is a perspective view on an enlarged scale showing the third anchor after power failure in release position.

A third anchor 22" is shown in FIGS. 13 and 14a-14b wherein moveable pulley 44 is latched in the jaws 82 of a pincher 84. Lock handle 38 is attached to one of jaws 82. The length of lock handle 38 and angle of cord 20 is such that the closing force applied to jaws 82 is sufficient to prevent release of moveable pulley 44 until cord 20 releases the tension on lock handle 38. The correct length of lock handle 38 and angle of cord 20 may be determined empirically.

Second and third anchors 22' and 22" may be used in a manner similar to that of first anchor 22 with curtain drop devices 18 having a cord release 20 as discussed above, one of which is illustrated.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A cable release for use in a curtain control system for controlling curtains in a livestock confinement building having an electrically-operated forced air ventilation system and drop curtains, said drop curtains providing supplemental ventilation during power failure or excess temperatures in the livestock confinement building, said curtain control system including a main lifting cable attached to the drop curtains, said lifting cable attached to a winch for lifting the drop curtains into closed position, said curtain control system further including a curtain drop device with a cord release, said cable release comprising:

a U-shaped segment of the main lifting cable between a top of the drop curtains and a winch, said U-shaped segment being longer than the linear distance between the top of the drop curtains and the winch;

an anchor attached to the U-shaped segment of cable with a latch for holding the U-shaped segment of cable in tension in a hold position; and, a curtain drop device with a cord release, said cord release movable between a hold position for normally holding a latch in hold position by a cord during application of electric current to the curtain drop device and a release position for releasing the latch upon interruption of electric current to the curtain drop device, said latch in release position releasing the anchor with the U-shaped segment of cable, said U-shaped segment of cable having a length sufficient to lower the drop curtains by a preselected amount.

2. The cable release of claim 1 wherein the anchor is a bolt slidable in a sleeve and the latch is a lock rod, said lock rod having a lock handle to which the cord is attached.

3. The cable release of claim 2 wherein each of said bolt and said lock rod has a slot, said lock handle attached to the lock rod, said bolt stopped in the sleeve by contact between the slot in the lock rod and the slot in the bolt when the latch is in hold position and free to slide in the sleeve when the latch is in release position.

4. The cable release of claim 3 wherein the bolt has a longitudinal center axis and the lock rod has a longitudinal center axis, said longitudinal center axis of the bolt normal to the longitudinal center axis of the lock rod, said lock rod having a slot with a slot bottom along a plane parallel to the longitudinal axis of the lock rod and a width and depth such that the bolt slides through the slot in the lock rod when the slot bottom is parallel to the longitudinal center axis of the bolt but which otherwise stops movement of the bolt in the sleeve.

5. The cable release of claim 4 wherein the bolt has a slot with a width and depth such that the lock rod may rotate in the bolt in a first direction but is stopped by a sidewall of the slot in the bolt when rotated in a second direction corresponding to the hold position of the latch.

6. The cable release of claim 5 wherein the bolt and the lock rod are spaced so that the slot in the bolt contacts less than a radial amount of the bottom of the slot in the lock rod.

7. A cable release for use in a curtain control system for controlling curtains in a livestock confinement building having an electrically-operated forced air ventilation system and drop curtains, said drop curtains providing supplemental ventilation during power failure or excess temperatures in the livestock confinement building, said curtain control system including a main lifting cable attached to the drop curtains, said lifting cable attached to a winch for lifting the drop curtains into closed position, said curtain control system further including a curtain drop device with a cord release, said cable release comprising:
   a panel with a pair of fixed pulleys in line with the main lifting cable;
   a moveable pulley attached to an anchor with a latch;
   a U-shaped segment of the main lifting cable between a top of the drop curtains and a winch, said U-shaped segment being longer than the linear distance between the top of the drop curtains and the winch and passing over the fixed pulleys and under the moveable pulley, said anchor attached to the moveable pulley for holding the U-shaped segment of cable in tension in a hold position of the latch; and,
   a curtain drop device with a cord release, said cord release movable between a hold position for normally holding the latch in hold position by a cord during application of electric current to the curtain drop device and a release position for releasing the latch upon interruption of electric current to the curtain drop device, said latch in release position releasing the anchor with the moveable pulley and the U-shaped segment of cable, said U-shaped segment of cable having a length sufficient to lower the drop curtains by a preselected amount.

8. The cable release of claim 7 wherein the anchor is a bolt slidable in a sleeve and the latch is a lock rod, said lock rod having a lock handle to which the cord is attached.

9. The cable release of claim 7 wherein a gas cylinder is attached to the bolt to slow the rate at which the curtains drop.

10. The cable release of claim 7 wherein a stop is provided on the bolt to limit the distance that the curtains are dropped.

\* \* \* \* \*